(12) United States Patent
Sakakibara (10) Patent No.: US 10,596,912 B2
(45) Date of Patent: Mar. 24, 2020

(54) ELECTRICALLY DRIVEN VEHICLE AND NOTIFICATION SYSTEM THEREFOR

(71) Applicant: Honda Motor Co., Ltd., Tokyo (JP)

(72) Inventor: Naoya Sakakibara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 15/935,059

(22) Filed: Mar. 26, 2018

(65) Prior Publication Data

US 2018/0345816 A1 Dec. 6, 2018

(30) Foreign Application Priority Data

Jun. 5, 2017 (JP) .................................. 2017-111143

(51) Int. Cl.
*B60L 11/18* (2006.01)
*B60Q 9/00* (2006.01)
(Continued)

(52) U.S. Cl.
CPC ......... *B60L 11/1875* (2013.01); *B60L 3/0046* (2013.01); *B60L 53/14* (2019.02);
(Continued)

(58) Field of Classification Search
CPC ...... B60L 11/1875; B60L 58/27; B60L 53/14; B60L 2250/16; B60L 1/00; B60L 1/006;
(Continued)

(56) References Cited

U.S. PATENT DOCUMENTS 9,321,366 B1 * 4/2016 Simonini .............. B60L 53/305
9,796,241 B2 * 10/2017 Takeuchi .................. B60L 1/02
(Continued)

FOREIGN PATENT DOCUMENTS

JP 2001-234840 8/2001
JP 2004146075 5/2004
(Continued)

OTHER PUBLICATIONS

Design of the Control Scheme of Power Battery Low Temperature Charging Heating Based on the Real Vehicle Applications; Ping Chen et al.; 2013 IEEE Vehicle Power and Propulsion Conference (VPPC); year: 2013, pp. 1-6.*
Experimental study on the effects of pre-heating a battery in a low-temperature environment; Hyun-Sik Song et al.; 2012 IEEE Vehicle Power and Propulsion Conference; Year: 2012; pp. 1198-1201.*

(Continued)

*Primary Examiner* — Cuong H Nguyen
(74) *Attorney, Agent, or Firm* — JCIPRNET (57) ABSTRACT

An electrically driven vehicle and a notification system therefor are provided. The electrically driven vehicle includes a high-voltage battery and an inlet, a charging connector of an external power source is connected to the inlet, and power can be supplied from the external power source to the high-voltage battery. The electrically driven vehicle includes a battery heater unit heating the high-voltage battery by using power supplied from the external power source; and a charging ECU detecting an alighting preparing operation of a user, acquiring an environmental temperature at a time of detection in accordance with detection of the alighting preparing operation, and causing a meter panel to display a message prompting a driver to connect the charging connector to the inlet when the acquired environmental temperature is equal to or lower than an output decline temperature set for the high-voltage battery.

8 Claims, 6 Drawing Sheets

(51) Int. Cl.
  *B60L 58/27* (2019.01)
  *B60L 53/14* (2019.01)
  *B60L 3/00* (2019.01)

(52) U.S. Cl.
  CPC ............. *B60L 58/27* (2019.02); *B60Q 9/00* (2013.01); *B60L 2240/662* (2013.01); *B60L 2250/16* (2013.01)

(58) Field of Classification Search
  CPC .... B60L 1/02; B60L 2240/34; B60L 2240/36; Y02T 90/14
  USPC .......................................................... 165/202
  See application file for complete search history.

(56) References Cited

U.S. PATENT DOCUMENTS

| | | | | |
|---|---|---|---|---|
| 2004/0100225 | A1* | 5/2004 | Neil .................. | B60L 1/003 320/109 |
| 2014/0041826 | A1* | 2/2014 | Takeuchi .................. | B60L 1/02 165/10 |
| 2014/0277869 | A1* | 9/2014 | King .................. | B60H 1/00278 701/22 |
| 2015/0061387 | A1* | 3/2015 | Daniel .................. | H02J 1/14 307/24 |
| 2015/0239474 | A1* | 8/2015 | Nakamura ...... | B60W 30/18127 180/170 |
| 2016/0080500 | A1* | 3/2016 | Penilla .................. | H04W 4/046 709/226 |
| 2017/0033417 | A1* | 2/2017 | Basu ....................... | F28F 27/00 |
| 2017/0284062 | A1* | 10/2017 | Osaka .................... | B60L 58/25 |
| 2018/0170208 | A1* | 6/2018 | Park .................... | B60L 11/1875 |

FOREIGN PATENT DOCUMENTS

| | | |
|---|---|---|
| JP | 2013153581 | 8/2013 |
| JP | 2017076544 | 4/2017 |

OTHER PUBLICATIONS

Thermal Management of Batteries Using Supercapacitor Hybrid Architecture With Idle Period Insertion Strategy; Donghwa Shin et al.; IEEE Transactions on Very Large Scale Integration (VLSI) Systems; Year: 2018, vol. 26 , Issue: 6, pp. 1159-1170.*

Analytical thermal model for characterizing a Li-ion battery cell; P. Cicconi et al.; 2013 World Electric Vehicle Symposium and Exhibition (EVS27); Year: 2013; pp. 1-11.*

"Office Action of Japan Counterpart Application," dated Mar. 5, 2019, with English translation thereof, p. 1-p. 6.

"Office Action of Japan Counterpart Application", dated Jul. 30, 2019, with English translation thereof, p. 1-p. 8.

"Office Action of Japan Counterpart Application," dated Oct. 16, 2018, with English translation thereof, pp. 1-6.

* cited by examiner

ELECTRICALLY DRIVEN VEHICLE AND NOTIFICATION SYSTEM THEREFOR

CROSS-REFERENCE TO RELATED APPLICATION

This application claims the priority benefit of Japanese application serial no. 2017-111143, filed on Jun. 5, 2017. The entirety of the above-mentioned patent application is hereby incorporated by reference herein and made a part of this specification.

BACKGROUND

Technical Field

The disclosure relates to an electrically driven vehicle and a notification system therefor.

Description of Related Art

Electrically driven vehicles travel by means of a motor driven using power supplied from a power storage device. Chemical batteries such as lithium-ion batteries or nickel metal hybrid batteries are widely used as the power storage device. However, since chemical batteries convert chemical energy into AC power through chemical reaction, chemical batteries have characteristics that their output declines as the temperature falls. Therefore, many power source devices for vehicles using a chemical battery as a power storage device include a heater for heating the power storage device such that the power storage device can be used in a desired state.

Patent Document 1 (Japanese Laid-open No. 2001-234840) discloses a hybrid vehicle which includes a battery and a heater for heating the battery and in which the battery is heated by the heater when a low-temperature start-up has been determined.

In a hybrid vehicle of Patent Document 1, although the performance of a low-temperature start-up can be improved by heating a battery at the time of a low-temperature start-up, a considerable time is taken until the temperature of the battery reaches a desired temperature after the start-up of the vehicle. Therefore, during a period from a start-up of the vehicle until the completion of heating of the battery, power saving control of intentionally suppressing an output of the battery may be executed and traveling performance during the period may deteriorate.

SUMMARY

An electrically driven vehicle (for example, an electrically driven vehicle V, which will be described below) which includes a storage battery (for example, a high-voltage battery 2, which will be described below) and an inlet (for example, an inlet 51, which will be described below) connected to the storage battery is provided. A connector (for example, a charging connector 83, which will be described below) of an external power supply source (for example, an external power source 80, which will be described below) is connected to the inlet, and power is able to be supplied from the external power supply source to the storage battery. The electrically driven vehicle includes alighting preparing operation detection means (for example, a vehicle speed sensor 603, a shift position sensor 601, and a charging ECU 61, which will be described below) for detecting an alighting preparing operation of a user; temperature acquisition means (for example, an outside air temperature sensor 652 and a battery temperature sensor 27, which will be described below) for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and notification means (for example, the charging ECU 61, a meter ECU 66, and a meter panel 3, which will be described below) for prompting a user to connect the connector to the inlet when the environmental temperature, the predicted environmental temperature, or the storage battery temperature, which has been acquired, is equal to or lower than a predetermined temperature.

A notification system (for example, a notification system NS, which will be described below) including an electrically driven vehicle (for example, an electrically driven vehicle V, which will be described below) which includes a storage battery (for example, a high-voltage battery 2, which will be described below) and an inlet (for example, an inlet 51, which will be described below) connected to the storage battery is provided. A connector (for example, a charging connector 83, which will be described below) of an external power supply source (for example, an external power source 80, which will be described below) is connected to the inlet, and power is able to be supplied from the external power supply source to the storage battery; and a portable terminal (for example, a portable terminal P, which will be described below) that is able to communicate with the electrically driven vehicle. The electrically driven vehicle includes alighting preparing operation detection means (for example, a vehicle speed sensor 603, a shift position sensor 601, and a charging ECU 61, which will be described below) for detecting an alighting preparing operation of a user; temperature acquisition means (for example, an outside air temperature sensor 652 and a battery temperature sensor 27, which will be described below) for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and communication means (for example, the charging ECU 61, a BCM 63, and a short-range radio communication unit 638, which will be described below) for transmitting a notification signal to the portable terminal when the environmental temperature, the predicted environmental temperature, or the storage battery temperature, which has been acquired, is equal to or lower than a predetermined temperature. The portable terminal prompts a user to connect the connector to the inlet when the notification signal is received.

DESCRIPTION OF THE EMBODIMENTS

The embodiments of the invention provide an electrically driven vehicle in which power can be supplied without suppressing an output from immediately after a start-up has begun even in a low-temperature environment, and a notification system therefor.

An electrically driven vehicle (for example, an electrically driven vehicle V, which will be described below) which includes a storage battery (for example, a high-voltage battery 2, which will be described below) and an inlet (for example, an inlet 51, which will be described below) connected to the storage battery is provided. A connector (for example, a charging connector 83, which will be described below) of an external power supply source (for example, an external power source 80, which will be described below) is connected to the inlet, and power is able to be supplied from the external power supply source to the storage battery. The electrically driven vehicle includes alighting preparing operation detection means (for example, a vehicle speed sensor 603, a shift position sensor 601, and a charging ECU 61, which will be described below) for detecting an alighting preparing operation of a user; temperature acquisition means (for example, an outside air temperature sensor 652 and a battery temperature sensor 27, which will be described below) for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and notification means (for example, the charging ECU 61, a meter ECU 66, and a meter panel 3, which will be described below) for prompting a user to connect the connector to the inlet when the environmental temperature, the predicted environmental temperature, or the storage battery temperature, which has been acquired, is equal to or lower than a predetermined temperature.

In one or some exemplary embodiments, the notification means include a display panel (for example, the meter panel 3, which will be described below) which is provided inside the vehicle and is visually recognizable by a driver. When the environmental temperature or the predicted environmental temperature, which has been acquired, is equal to or lower than the predetermined temperature, the display panel display a message prompting a driver to connect the connector to the inlet for a predetermined period of time after an ignition switch is turned off.

In one or some exemplary embodiments, the electrically driven vehicle further includes a heater (for example, a battery heater unit 24, which will be described below) that heats the storage battery by using power supplied from the external power supply source or the storage battery.

A notification system (for example, a notification system NS, which will be described below) including an electrically driven vehicle (for example, an electrically driven vehicle V, which will be described below) which includes a storage battery (for example, a high-voltage battery 2, which will be described below) and an inlet (for example, an inlet 51, which will be described below) connected to the storage battery is provided. A connector (for example, a charging connector 83, which will be described below) of an external power supply source (for example, an external power source 80, which will be described below) is connected to the inlet, and power is able to be supplied from the external power supply source to the storage battery; and a portable terminal (for example, a portable terminal P, which will be described below) that is able to communicate with the electrically driven vehicle. The electrically driven vehicle includes alighting preparing operation detection means (for example, a vehicle speed sensor 603, a shift position sensor 601, and a charging ECU 61, which will be described below) for detecting an alighting preparing operation of a user; temperature acquisition means (for example, an outside air temperature sensor 652 and a battery temperature sensor 27, which will be described below) for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and communication means (for example, the charging ECU 61, a BCM 63, and a short-range radio communication unit 638, which will be described below) for transmitting a notification signal to the portable terminal when the environmental temperature, the predicted environmental temperature, or the storage battery temperature, which has been acquired, is equal to or lower than a predetermined temperature. The portable terminal prompts a user to connect the connector to the inlet when the notification signal is received.

In one or some exemplary embodiments, the electrically driven vehicle further includes a heater (for example, a battery heater unit 24, which will be described below) which heats the storage battery by using power supplied from the external power supply source or the storage battery.

In the electrically driven vehicle of the embodiments of the invention, when a user (driver) performs an alighting preparing operation for alighting from the electrically driven vehicle, the alighting preparing operation detection means detects the operation, the temperature acquisition means acquires an environmental temperature, a predicted environmental temperature, or a storage battery temperature at the time of detection of the operation, and the notification means prompts a user to connect the connector to the inlet when the environmental temperature, the predicted environmental temperature, or the storage battery temperature is equal to or lower than a predetermined temperature. In addition, when the connector is connected to the inlet by a user who has received such a notification, the storage battery is charged while using power from the external power supply source and is heated by means of heat of reaction or Joule heat during the charging. Here, it is considered that the temperature of the storage battery gradually falls after the electrically driven vehicle stops, and the temperature of the storage battery at the time of restarting of the electrically driven vehicle is equivalent to the environmental temperature. Therefore, when the environmental temperature or the predicted environmental temperature at the time of detection of the alighting preparing operation is equal to or lower than the predetermined temperature, it denotes that the temperature of the storage battery at the time of restarting of the electrically driven vehicle is assumed to be equal to or lower than the predetermined temperature. In the embodiments of the invention, in such a case, or in a case in which the temperature of the storage battery at the time of detection of an alighting preparing operation is already equal to or lower than the predetermined temperature, a user is prompted to connect the connector to the inlet, so that the storage battery is charged even when the electrically driven vehicle is restarted in a low-temperature environment at equal to or lower than the predetermined temperature. In addition, the vehicle can start traveling in a state in which the storage battery has already been heated. Accordingly, there are cases in which power can be supplied without suppressing the output of the storage battery immediately after a start-up has begun.

In the electrically driven vehicle of the embodiments of the invention, when the environmental temperature or the predicted environmental temperature at the time of detection of an alighting preparing operation is equal to or lower than the predetermined temperature, the display panel provided inside the vehicle displays a message prompting a driver to connect the connector to the inlet for a predetermined period of time after the ignition switch is turned off. A user usually performs an alighting preparing operation, turns off the ignition switch at the end thereof, opens a door, and alights from the vehicle. In the electrically driven vehicle of the embodiments of the invention, the display panel inside the vehicle displays a message prompting a user to connect the connector for the predetermined period of time after the ignition switch is turned off. Accordingly, it is possible to improve the probability that a user will visually recognize the message at the stage of remaining inside the vehicle before leaving the electrically driven vehicle far therefrom, and thus it is possible to prevent the connector from being left without being connected.

The electrically driven vehicle of the embodiments of the invention further includes the heater that heats the storage battery by using power supplied from the external power supply source or the storage battery. Accordingly, in the electrically driven vehicle in which the connector is connected to the inlet, the storage battery can be heated by using the heater. Therefore, even when the electrically driven vehicle is restarted in a low-temperature environment at equal to or lower than the predetermined temperature, the vehicle can start traveling in a state in which the storage battery is heated to a desired temperature at the time of restarting.

In the notification system of the electrically driven vehicle of the embodiments of the invention, when a user (driver) performs an alighting preparing operation for alighting from the electrically driven vehicle, the alighting preparing operation detection means detects the operation. The temperature acquisition means acquires an environmental temperature, a predicted environmental temperature, or a storage battery temperature at the time of detection of the operation. The communication means transmits a notification signal to the portable terminal when the environmental temperature, the predicted environmental temperature, or the storage battery temperature is equal to or lower than a predetermined temperature. The portable terminal prompts a user to connect the connector to the inlet when the notification signal is received. In addition, when the connector is connected to the inlet by a user who has received such a notification from the portable terminal, the storage battery is charged while using power from the external power supply source and is heated by means of heat of reaction or Joule heat during the charging. In the embodiments of the invention, in such a case, a user is prompted to connect the connector to the inlet, so that the storage battery is charged even when the electrically driven vehicle is restarted in a low-temperature environment at equal to or lower than the predetermined temperature. In addition, the vehicle can start traveling in a state in which the storage battery has already been heated. Accordingly, there are cases in which power can be supplied without suppressing the output of the storage battery immediately after a start-up has begun. Here, there may be cases in which a user is in a hurry so that the user alights from the electrically driven vehicle and leaves without connecting the connector to the inlet. In contrast, in the embodiments of the invention, since a user is prompted to connect the connector utilizing the portable terminal, even when the user leaves the electrically driven vehicle without connecting the connector, it is possible to recognize, via the portable terminal, that the connector is left without being connected.

The electrically driven vehicle of the embodiments of the invention further includes the heater that heats the storage battery by using power supplied from the external power supply source or the storage battery. Accordingly, in the electrically driven vehicle in which the connector is connected to the inlet, the storage battery can be heated by using the heater. Therefore, even when the electrically driven vehicle is restarted in a low-temperature environment at equal to or lower than the predetermined temperature, the vehicle can start traveling in a state in which the storage battery is heated to a desired temperature at the time of restarting.

Hereinafter, embodiments of the invention will be described with reference to the drawings.

Figure 1:
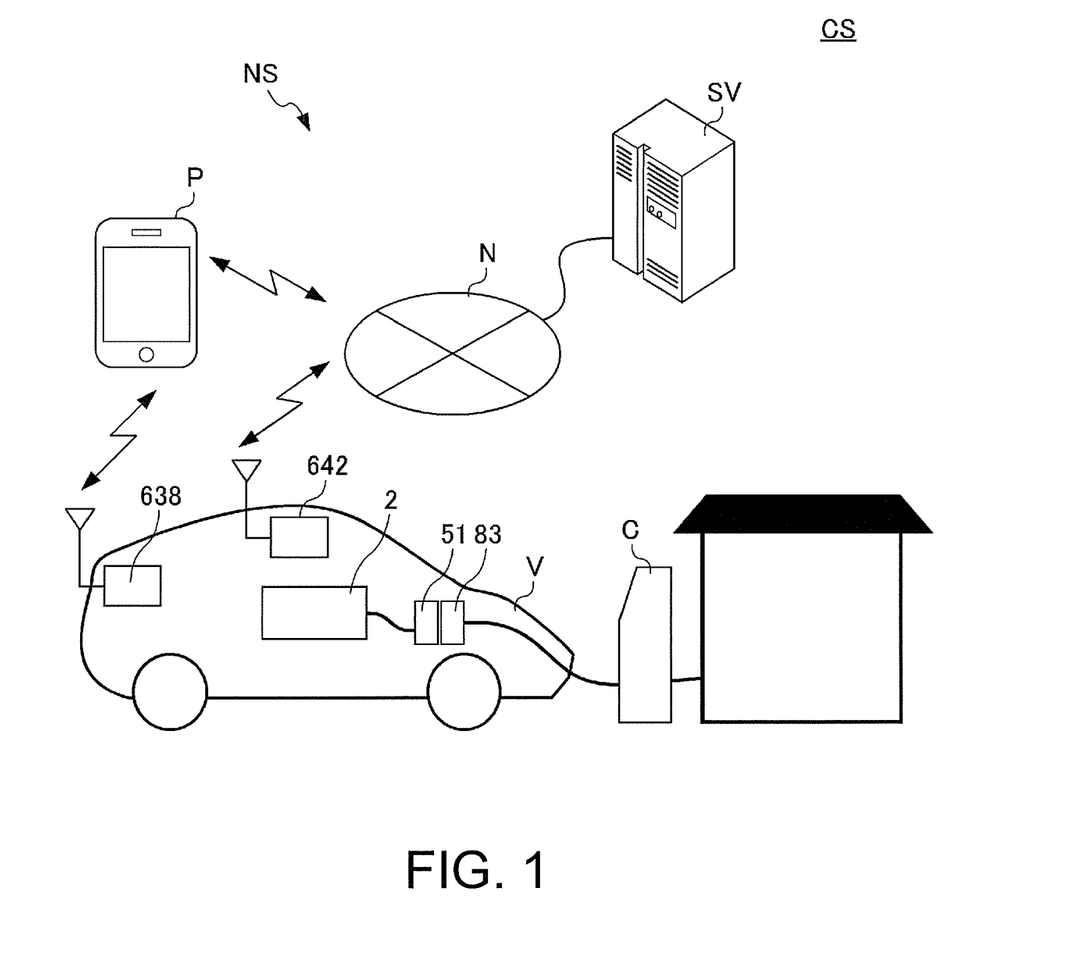
FIG. 1 is a view illustrating a configuration of a charging system including an electrically driven vehicle and a notification system according to an embodiment of the invention.

FIG. 1 is a view illustrating a configuration of a charging system CS including an electrically driven vehicle V and a notification system NS according to the present embodiment.

The charging system CS includes the electrically driven vehicle V (which will hereinafter be simply referred to as the "vehicle V") which includes a high-voltage battery 2 and an inlet 51 connected to the high-voltage battery 2, an external charger C which can supply power to the high-voltage battery 2 when a connector 83 is connected to the inlet 51, a portable terminal P which is carried by a user (a driver of the vehicle V), and a server SV which is connected to the vehicle V and the portable terminal P via a public communication network N such that communication can be performed therebetween.

In description below, a case of using an AC power source for household use, as the external charger C, installed in a residence of a user of the vehicle V and the portable terminal P is described. However, the embodiments of the invention are not limited thereto. The external charger C may be a high-speed charger installed in a charging station, commercial facility, or public facility, which is facility mainly for charging.

The public communication network N is a communication network constituted of a telephone network, the internet, a base station, and the like. In addition, for example, the portable terminal P is a radio-type portable terminal, such as a smartphone or a tablet terminal, which includes a display visually recognizable by a user and can perform data communication utilizing the public communication network N.

As described below in detail, a short-range radio communication unit 638 is provided in the vehicle V, which can thereby directly communicate with the portable terminal P. However, the direct communication between the vehicle V and the portable terminal P is limited to a case in which the distance between the vehicle V and the portable terminal P is several tens of meters or less.

In addition, as described below in detail, a broadband radio communication unit 642 is provided in the vehicle V, which can thereby perform data communication utilizing the public communication network N. Therefore, even when direct communication utilizing the short-range radio communication unit 638 cannot be performed (for example, when the portable terminal P is at a position away from the vehicle V beyond a range in which communication can be performed with the short-range radio communication unit 638), the vehicle V and the portable terminal P can communicate with each other through the server SV.

In the charging system CS as described above, the notification system NS is constituted of the vehicle V, the server SV, and the portable terminal P. The notification system NS prompts a user of the vehicle V to connect the charging connector 83 to the inlet 51 at an appropriate timing by using the vehicle V, the server SV, and the portable terminal P which are connected to be able to communicate with each other.

Figure 2:
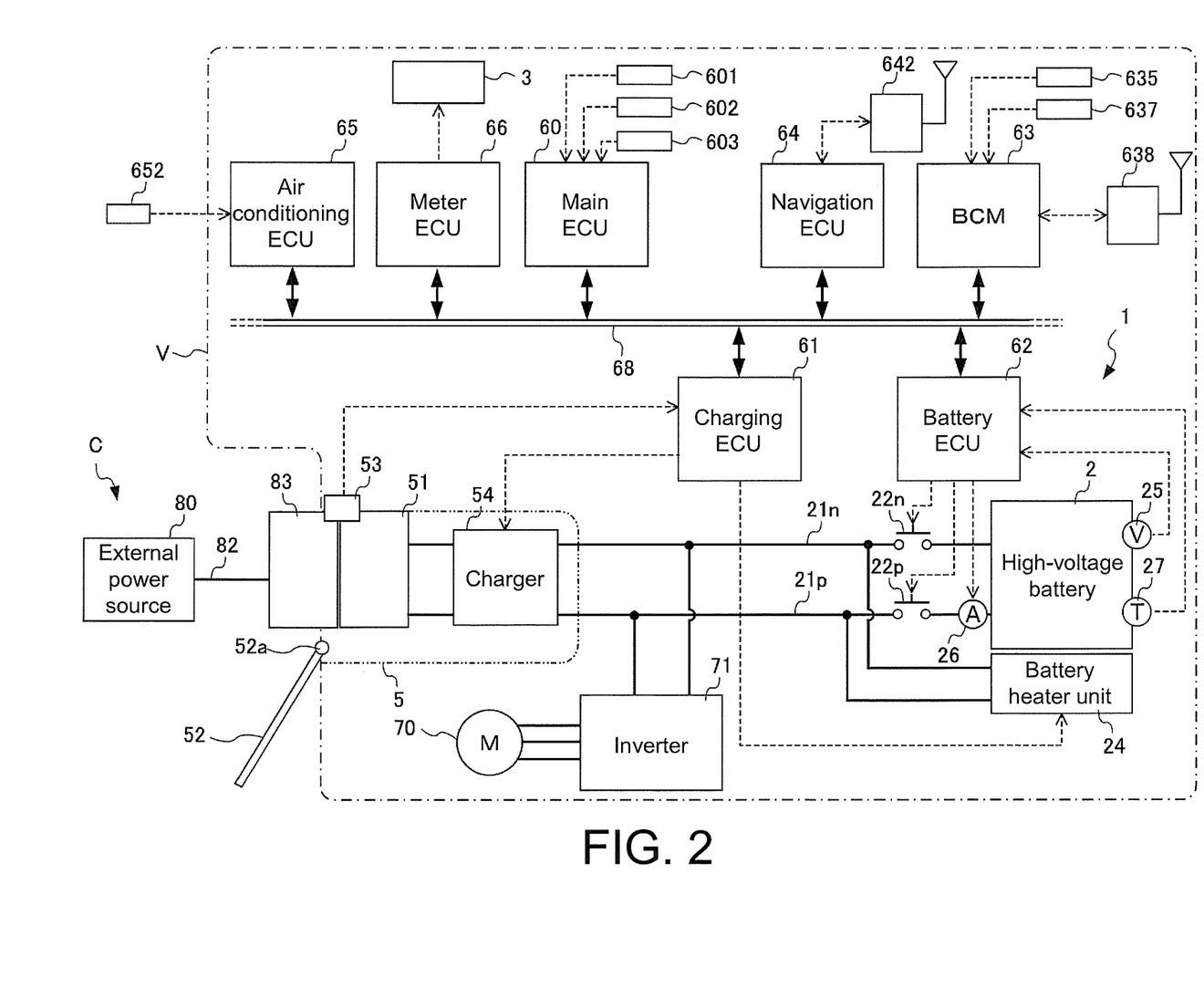
FIG. 2 is a view illustrating a configuration of an external charger and the vehicle in the charging system.

FIG. 2 is a view illustrating a configuration of the external charger C and the vehicle V in the charging system CS.

The external charger C includes an external power source 80 which outputs an alternating current (specifically, for example, AC 200 V), the charging connector 83 which can be operated by a user, and a power line 82 which connects the external power source 80 and the charging connector 83 to each other. When a user performs charging control of the high-voltage battery 2 mounted in the vehicle V or heating control of the high-voltage battery 2 by using the external charger C, the charging connector 83 is connected to the inlet 51 provided in the vehicle V. When the charging connector 83 is connected to the inlet 51, the power line 82 and power lines 21p and 21n (which will be described below) are electrically connected to each other. Accordingly, power can be supplied from the external power source 80 of the external charger C to the high-voltage battery (which will hereinafter be simply referred to as "external charging"), and power can be supplied from the external power source 80 to a battery heater unit 24 (which will be described below).

The vehicle V includes a traveling motor 70 which is mechanically joined to driving wheels (not illustrated); an inverter 71 which is connected to the traveling motor 70; a power source device 1 which serves as a power supply source for the traveling motor 70, the inverter 71, and electrical equipment mounted in the vehicle V; a meter panel 3 which is visually recognizable by a driver; and a plurality of electronic control units for controlling various electrical equipment mounted in the vehicle V, such as a main ECU 60, a charging ECU 61, a battery ECU 62, a body control module 63 (which will hereinafter be referred to as a "BCM 63"), a navigation ECU 64, an air conditioning ECU 65, and a meter ECU 66.

For example, the traveling motor 70 is a three-phase AC motor. The traveling motor 70 generates a driving force when power is supplied from the high-voltage battery 2 of the power source device 1 via the inverter 71. In addition, the traveling motor 70 generates power by performing a regenerative operation. Power generated through a regenerative operation of the traveling motor 70 is supplied to the high-voltage battery 2 via the inverter 71 and charges the high-voltage battery 2.

The inverter 71 is connected to the power lines 21p and 21n (which will be described below) and converts a direct current supplied from the high-voltage battery 2 via the power lines 21p and 21n into a three-phase alternating current, thereby supplying the converted alternating current to the traveling motor 70. In addition, during a regenerative operation of the traveling motor 70, the inverter 71 converts an alternating current supplied from the traveling motor 70 into a direct current and supplies the converted direct current to the high-voltage battery 2.

The power source device 1 includes the high-voltage battery 2, an external charging unit 5 to which the external charger C is connected, a positive electrode-side power line 21p and a negative electrode-side power line 21n (which will hereinafter be collectively referred to as the "power lines 21p and 21n") which connect the external charging unit 5 and the high-voltage battery 2 to each other, and the battery heater unit 24 which is connected to the power lines 21p and 21n.

The high-voltage battery 2 is a secondary battery which is capable of both discharging in which chemical energy is converted into electric energy and charging in which electric energy is converted into chemical energy. In description below, a case of using a so-called lithium ion battery as the high-voltage battery 2 in which charging and discharging are performed due to lithium ions moving between the electrodes is described. However, the embodiments of the invention are not limited thereto.

A positive electrode-side main contactor 22p and a negative electrode-side main contactor 22n (which will hereinafter be collectively referred to as "main contactors 22p and 22n") which connect and disconnect the power lines 21p and 21n are provided on the high-voltage battery 2 side of parts to which the inverter 71 and the battery heater unit 24 are connected of the power lines 21p and 21n extending from the high-voltage battery 2 to the external charging unit 5.

The main contactors 22p and 22n are normally open-type contactors which are open in a state in which no command signal is input from the outside. The main contactors 22p and 22n are closed in response to a command signal from the battery ECU 62. More specifically, for example, when charging and discharging are performed between the high-voltage battery 2 and the inverter 71 while the vehicle V is traveling, when external charging of the high-voltage battery 2 is performed by supplying power from the external charger C to the high-voltage battery 2, or when charging of the low-voltage battery 3 is performed by supplying power of the high-voltage battery 2 to a low-voltage battery 3, the main contactors 22p and 22n are closed in response to a command signal from the battery ECU 62.

The battery heater unit 24 includes an electric heater which generates heat when conducting electricity and a switch which connects and disconnects the electric heater with respect to the power lines 21p and 21n. The battery heater unit 24 is provided in the vicinity of the high-voltage battery 2. That is, when the switch of the battery heater unit 24 is turned on and power from the high-voltage battery 2 or the external power source 80 is supplied to the electric heater via the power lines 21p and 21n, the electric heater generates heat and heats the high-voltage battery 2.

As the electric heater of the battery heater unit 24, a PTC heater having characteristics in which as its temperature rises, its electrical resistance value changes while having a positive coefficient (so-called PTC characteristics) is used, for example. When such a PTC heater is used, the temperature of the high-voltage battery 2 can be stabilized at a predetermined setting temperature without performing feedback control using an output of a temperature sensor, after the switch is turned on and the PTC heater starts conducting electricity. Here, for example, the setting temperature of the PTC heater is an output decline temperature (which will be described below, refer to FIG. 3) or a heating target temperature which is set to be slightly higher than the output decline temperature.

The external charging unit 5 includes the inlet 51 to which the charging connector 83 can be connected, a charging lid 52 which protects the inlet 51, a connector sensor 53 which detects connection of the charging connector 83 to the inlet 51, and a charger 54 which is provided for the power lines 21p and 21n. The external charging unit 5 is provided on a side portion of the vehicle V.

Terminals for the power lines 21p and 21n are provided in the inlet 51. When the charging connector 83 is connected to the inlet 51, the power line 82 on the external charger C side and the power lines 21p and 21n on the vehicle V side are electrically connected to each other. Accordingly, power can be supplied from the external power source 80 of the external charger C to the high-voltage battery 2, the battery heater unit 24, and the like via the charger 54.

The charging lid 52 has a plate shape and is pivotally supported by a hinge 52a provided in a vehicle body (not illustrated) of the vehicle V to be able to be opened and closed. When the charging lid 52 is closed, the charging lid 52 constitutes a portion of an outer panel of the vehicle V, thereby protecting the inlet 51. In addition, when the charging lid 52 is open, the inlet 51 is exposed to the outside, so that a user can connect the charging connector 83 to the inlet 51.

The charger 54 is an AC/DC converter which converts AC power from the external power source 80 into DC power and supplies the DC power to the high-voltage battery 2, the battery heater unit 24, and the like via the power lines 21p and 21n.

The connector sensor 53 is turned off while the charging connector 83 is not connected to the inlet 51. When the charging connector 83 is connected to the inlet 51, the connector sensor 53 transmits a signal indicating the state to the charging ECU 61. The charging ECU 61 determines whether or not the charging connector 83 is connected to the inlet 51 based on a detection signal from the connector sensor 53.

Each of the main ECU 60, the charging ECU 61, the battery ECU 62, the BCM 63, the navigation ECU 64, the air conditioning ECU 65, and the meter ECU 66 is a microcomputer including an I/O interface which performs A/D conversion of detection signals from sensors of various types, a RAM or a ROM which stores programs and data of various types, a CPU which executes computation processing of various types in accordance with the programs, and a drive circuit which drives electronic equipment of various types in accordance with computation processing results of the CPU.

The electronic control units, such as the main ECU 60, the charging ECU 61, the battery ECU 62, the BCM 63, the navigation ECU 64, the air conditioning ECU 65, and the meter ECU 66 are connected to each other via a CAN bus 68 that is a bus-type network in which various types of control information are exchanged and in which required control information can be transmitted and received therebetween.

The main ECU 60 is a microcomputer in charge of control of traveling of the vehicle V, such as traveling control using the traveling motor 70, the inverter 71, and the like, and management of the high-voltage battery 2. Various sensors for detecting information required in controlling traveling of the vehicle V, such as an ignition switch 601 for performing an on/off operation when a driver starts or stops the vehicle V, a shift position sensor 602 for detecting a shift position (for example, a drive range, a neutral range, a reverse range, a parking range, and the like) of a gearbox (not illustrated), and a vehicle speed sensor 603 for detecting a vehicle speed of the vehicle V, are connected to the main ECU 60.

The charging ECU 61 is a microcomputer in charge of external charging control of the high-voltage battery 2 using the external charger C (refer to FIG. 4 described below), external heating control of the high-voltage battery 2 (refer to FIG. 5 described below), and the like.

The battery ECU 62 is a microcomputer in charge of control of an on/off operation of the main contactors 22p and 22n, monitoring of a state of the high-voltage battery 2, and the like. A voltage sensor 25 for detecting a voltage of the high-voltage battery 2, a current sensor 26 for detecting an output current or a charging current of the high-voltage battery 2, and a battery temperature sensor 27 for detecting a temperature of the high-voltage battery 2 are connected to the battery ECU 62. A charging rate (ratio of the remaining capacity to the fully charged capacity of the battery expressed in a percentage, which will hereinafter be referred to as a "state of charge (SOC)") of the high-voltage battery 2 is calculated by using detection signals of the sensors 25 to 27.

Figure 3:
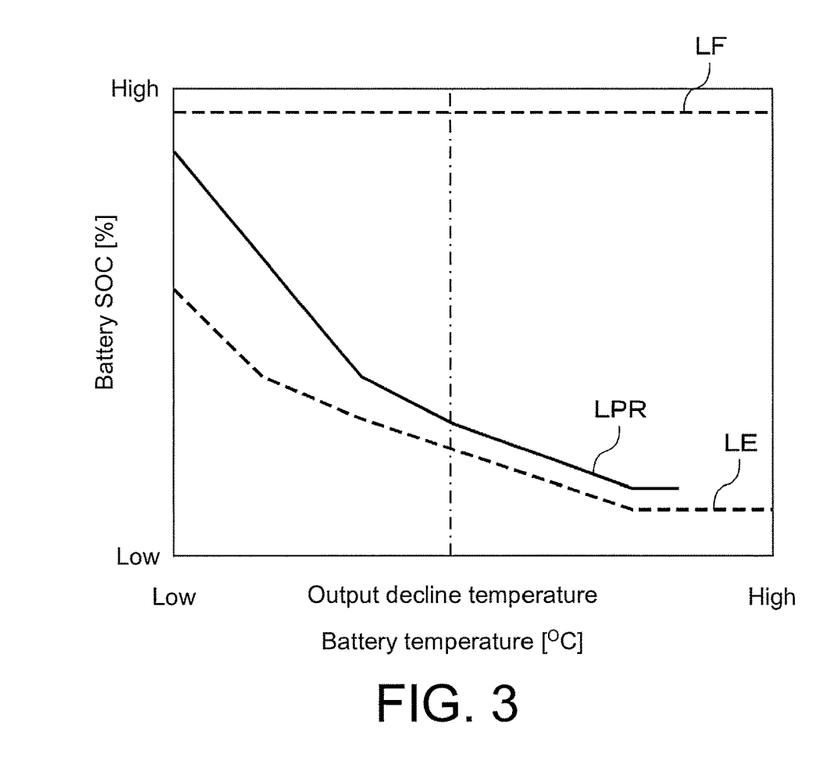
FIG. 3 is a view illustrating a relationship between a battery SOC and a battery temperature.

FIG. 3 is a view illustrating a relationship between the SOC and the temperature of the high-voltage battery 2.

In FIG. 3, a dotted line LF is a line obtained by plotting points F of the high-voltage battery 2 set for each battery temperature. That is, when the battery SOC is higher than the dotted line LF, the battery ECU 62 determines that the high-voltage battery 2 has substantially reached a fully charged state and cannot be charged. In addition, a dotted line LE is a line obtained by plotting points E of the high-voltage battery 2 set for each battery temperature. That is, when the battery SOC falls below the dotted line LE, the battery ECU 62 determines that the high-voltage battery 2 cannot be discharged.

As indicated with the dotted line LE in FIG. 3, the points E of the high-voltage battery 2 are set to be higher as the battery temperature falls, because the single pole capacity of the high-voltage battery 2 decreases as the battery temperature falls.

In addition, in FIG. 3, a solid line LPR is a line obtained by plotting output suppression points of the high-voltage battery 2 set for each battery temperature. When the battery SOC falls below the solid line LPR while the vehicle V is traveling, in order to prevent the battery SOC reaching the point E during traveling, the battery ECU 62 requests that the main ECU 60 executes power saving control of intentionally suppressing the output from the high-voltage battery 2.

As indicated with the solid line LPR in FIG. 3, the output suppression points of the high-voltage battery are set between the points F and the points E while being slightly higher than positions of the points E. In addition, the output suppression points are set to be higher as the battery temperature falls and to be closer to the points F as the battery temperature falls, because since the single pole capacity of the high-voltage battery 2 decreases as the battery temperature falls as described above, there is a need to suppress the output of the high-voltage battery 2 at an earlier timing as the battery temperature falls.

Returning to FIG. 2, the BCM 63 is a microcomputer in charge of control of door locking of the vehicle V, an entry operation of the vehicle V using the portable terminal P, and the like. A door sensor 635 for detecting opening and closing of doors (not illustrated), a lock sensor 637 for detecting whether or not the doors are locked, and the like are connected to the BCM 63. In addition, in order to perform short-range radio communication (for example, communication based on Bluetooth (registered trademark)) with the portable terminal P outside the vehicle V using radio waves, the short-range radio communication unit 638 is connected to the BCM 63. The BCM 63 directly communicates with the portable terminal P via the short-range radio communication unit 638, thereby receiving an entry operation from the portable terminal P, or transmitting warning information from the BCM 63 to the portable terminal P, as described below with reference to FIG. 6.

The navigation ECU 64 is a microcomputer in charge of control of data communication utilizing a car navigation system (not illustrated) or the public communication network N. In order to perform broadband radio communication with the server SV via the public communication network N using radio waves, the broadband radio communication unit 642 is connected to the navigation ECU 64. The navigation ECU 64 transmits information related to the vehicle V to the server SV via the broadband radio communication unit 642.

The air conditioning ECU 65 is a microcomputer in charge of control of an air conditioner (not illustrated). An outside air temperature sensor 652 for detecting an outside air temperature (temperature outside the vehicle V) is connected to the air conditioning ECU 65.

The meter ECU 66 is a microcomputer in charge of display control of the meter panel 3. After the ignition switch 601 is turned on, the meter ECU 66 causes the meter panel 3 to display information related to the vehicle speed, the shift position, the traveling distance, and the like. In addition, after the ignition switch 601 is turned off, the meter ECU 66 executes panel display processing as described below with reference to FIG. 6, and causes the meter panel 3 to display various information, messages, and the like.

Figure 4:
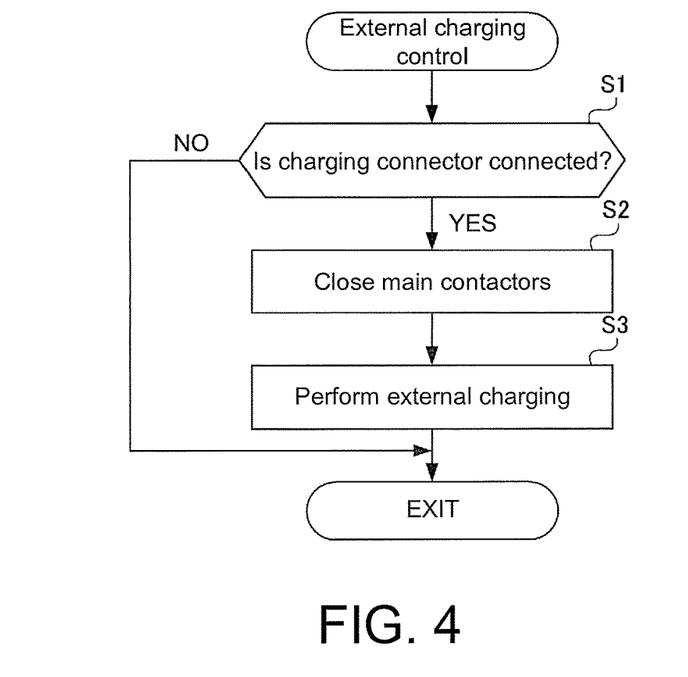
FIG. 4 is a flowchart illustrating a specific procedure of external charging control processing.

FIG. 4 is a flowchart illustrating a specific procedure of external charging control processing. For example, the charging ECU 61 and the battery ECU 62 execute the processing in FIG. 4 triggered by a preliminary operation (for example, an operation of opening the charging lid 52) performed by a user to connect the charging connector 83 of the external charger C to the inlet 51 while the vehicle V is at a stop.

First, in S1, the charging ECU 61 determines whether or not the charging connector 83 is connected to the inlet 51 by using a detection signal from the connector sensor 53. When the determination in S1 is NO, the charging ECU 61 ends the current processing and executes the processing of S1 again after a predetermined time. When the determination in S1 is YES, the charging ECU 61 proceeds to S2.

In S2, the charging ECU 61 closes the main contactors 22p and 22n and proceeds to S3. Accordingly, the external power source 80 of the external charger C and the high-voltage battery 2 of the vehicle V are connected to each other via the charger 54, so that external charging of the high-voltage battery 2 can be performed.

In S3, the charging ECU 61 drives the charger 54 to supply a direct current of a predetermined charging voltage to the high-voltage battery 2, thereby executing external charging of the high-voltage battery 2. Accordingly, the high-voltage battery 2 is charged and is heated by means of heat of reaction or Joule heat during the charging. The charging ECU 61 successively acquires the SOC of the high-voltage battery 2 from the battery ECU 62, and when the SOC of the high-voltage battery 2 reaches the point F set in advance (refer to the dotted line LF in FIG. 3) or a voltage in a fully charged state set in the vicinity of the point F, the charging ECU 61 ends external charging of the high-voltage battery 2.

Figure 5:
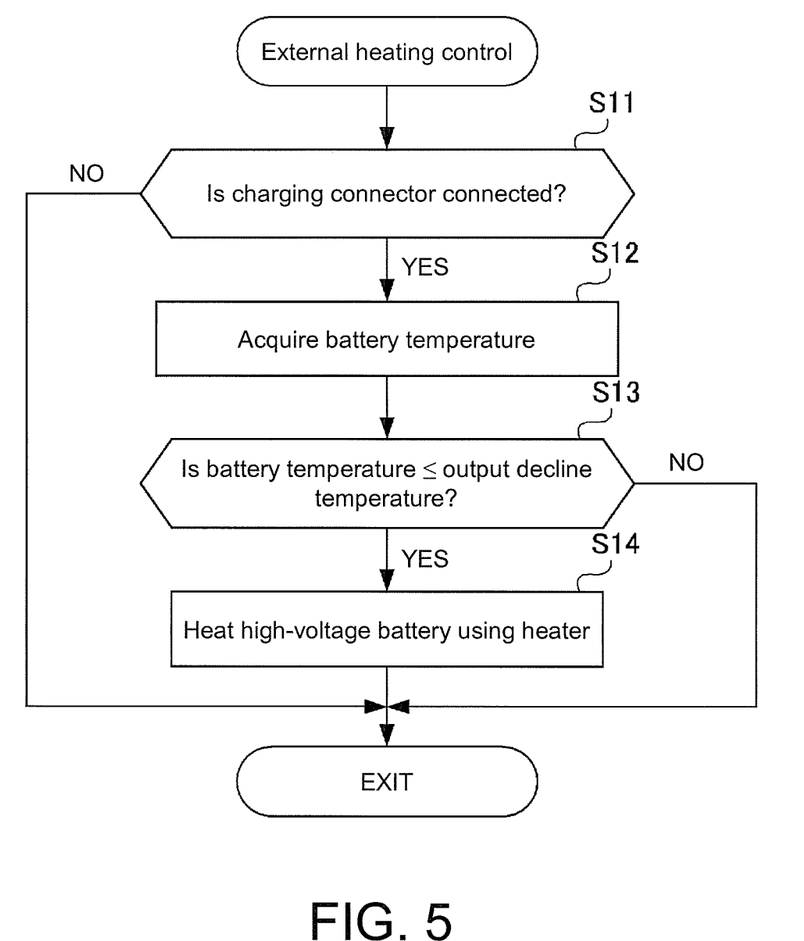
FIG. 5 is a flowchart illustrating a specific procedure of external heating control processing.

FIG. 5 is a flowchart illustrating a specific procedure of external heating control processing. For example, the charging ECU 61 and the battery ECU 62 execute the processing in FIG. 5 triggered by a preliminary operation (for example, an operation of opening the charging lid 52) performed by a user to connect the charging connector 83 of the external charger C to the inlet 51 while the vehicle V is at a stop. That is, the external heating control processing in FIG. 5 and the external charging control processing in FIG. 4 can be executed together at the same time.

First, in S11, the charging ECU 61 determines whether or not the charging connector 83 is connected to the inlet 51 by using a detection signal from the connector sensor 53. When the determination in S11 is NO, the charging ECU 61 ends the current processing and executes the processing of S11 again after a predetermined time. When the determination in S11 is YES, the charging ECU 61 proceeds to S12.

In S12, the charging ECU 61 acquires the temperature of the high-voltage battery 2 from the battery ECU 62 and proceeds to S13. In S13, the charging ECU 61 determines whether or not the battery temperature acquired in S12 is equal to or lower than a predetermined output decline temperature. Here, for example, the output decline temperature is a temperature at which the output of the high-voltage battery 2 starts declining noticeably, as illustrated in FIG. 3. More specifically, for example, the output decline temperature is 0° C. When the determination in S13 is NO, the charging ECU 61 determines that the high-voltage battery 2 does not need to be heated. Then, the charging ECU 61 ends the current processing and executes the processing of S11 again after a predetermined time.

When the determination in S13 is YES, in order to prevent output decline of the high-voltage battery 2 at the time of the next start-up of the vehicle V, the charging ECU 61 determines that the high-voltage battery 2 needs to be heated, and the charging ECU 61 proceeds to S14. In S14, the charging ECU 61 turns on the switch of the battery heater unit 24 and supplies power, which is supplied from the external power source 80 via the charger 54, to the electric heater of the battery heater unit 24, thereby heating the high-voltage battery 2. Here, the charging ECU 61 performs electricity conduction control of the electric heater such that the temperature of the high-voltage battery 2 is maintained at the output decline temperature or the heating target temperature which is set to be slightly higher than the output decline temperature. Here, when the PTC heater is used as the electric heater of the battery heater unit 24 as described above, the setting temperature is set to the heating target temperature, so that the temperature of the high-voltage battery 2 can be maintained at the heating target temperature without depending on feedback control using the temperature sensor.

As described above, when the charging connector 83 is connected to the inlet 51, external charging and heating of the high-voltage battery 2 are executed as necessary by using power supplied from the external power source 80. On the other hand, when the vehicle V is neglected without connecting the charging connector 83 to the inlet 51, external charging of the high-voltage battery 2 is not performed and heating is also not performed. Therefore, when a user restarts the vehicle V, the vehicle V inevitably starts traveling in a state in which both the battery SOC and the battery temperature are low. Particularly, when it is cold, the battery temperature also falls, and power saving control is likely to be executed as described above with reference to FIG. 3. Therefore, in the notification system NS, connector connection recommendation notification processing of prompting a user to connect the charging connector 83 to the inlet 51 is executed.

Figure 6:
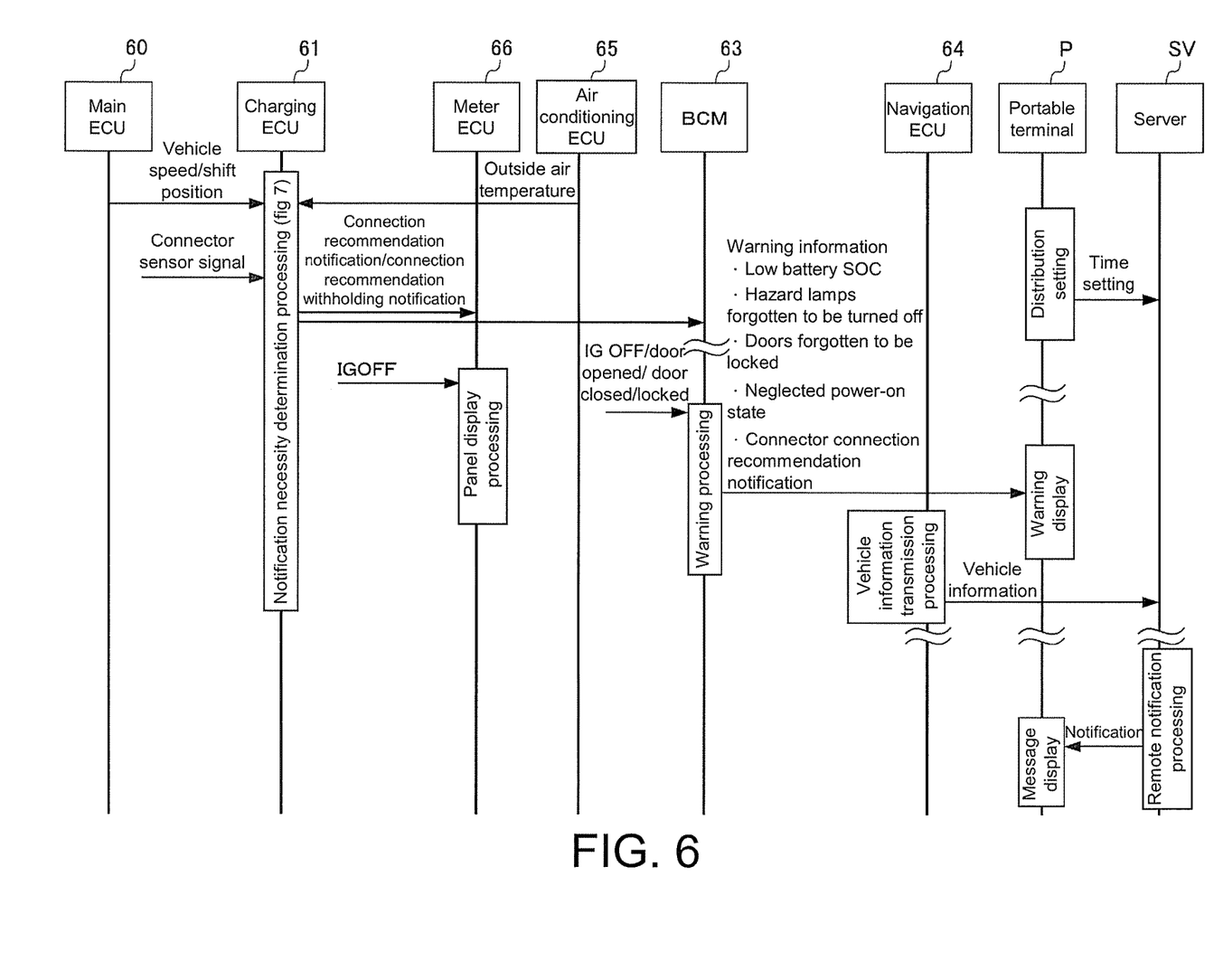
FIG. 6 is a sequence diagram illustrating a procedure of connector connection recommendation notification processing.

FIG. 6 is a sequence diagram illustrating a procedure of connector connection recommendation notification processing in the notification system NS.

First, the main ECU 60 transmits information related to the current vehicle speed and the current shift position to the charging ECU 61 in a predetermined cycle or in response to a request from the charging ECU 61, while an ignition switch IG is turned on. In addition, the air conditioning ECU 65 transmits information related to the current outside air temperature of the vehicle V to the charging ECU 61 in a predetermined cycle or in response to a request from the charging ECU 61, while the ignition switch IG is turned on.

In addition, the charging ECU 61 executes notification necessity determination processing determining whether or not there is a need to prompts a user to connect the charging connector 83 to the inlet 51, by using information related to the vehicle speed acquired from the main ECU 60, information related to the shift position, information related to the outside air temperature acquired from the air conditioning ECU 65, and information, which is transmitted from the connector sensor 53, related to whether or not the charging connector 83 is connected to the inlet 51.

Figure 7:
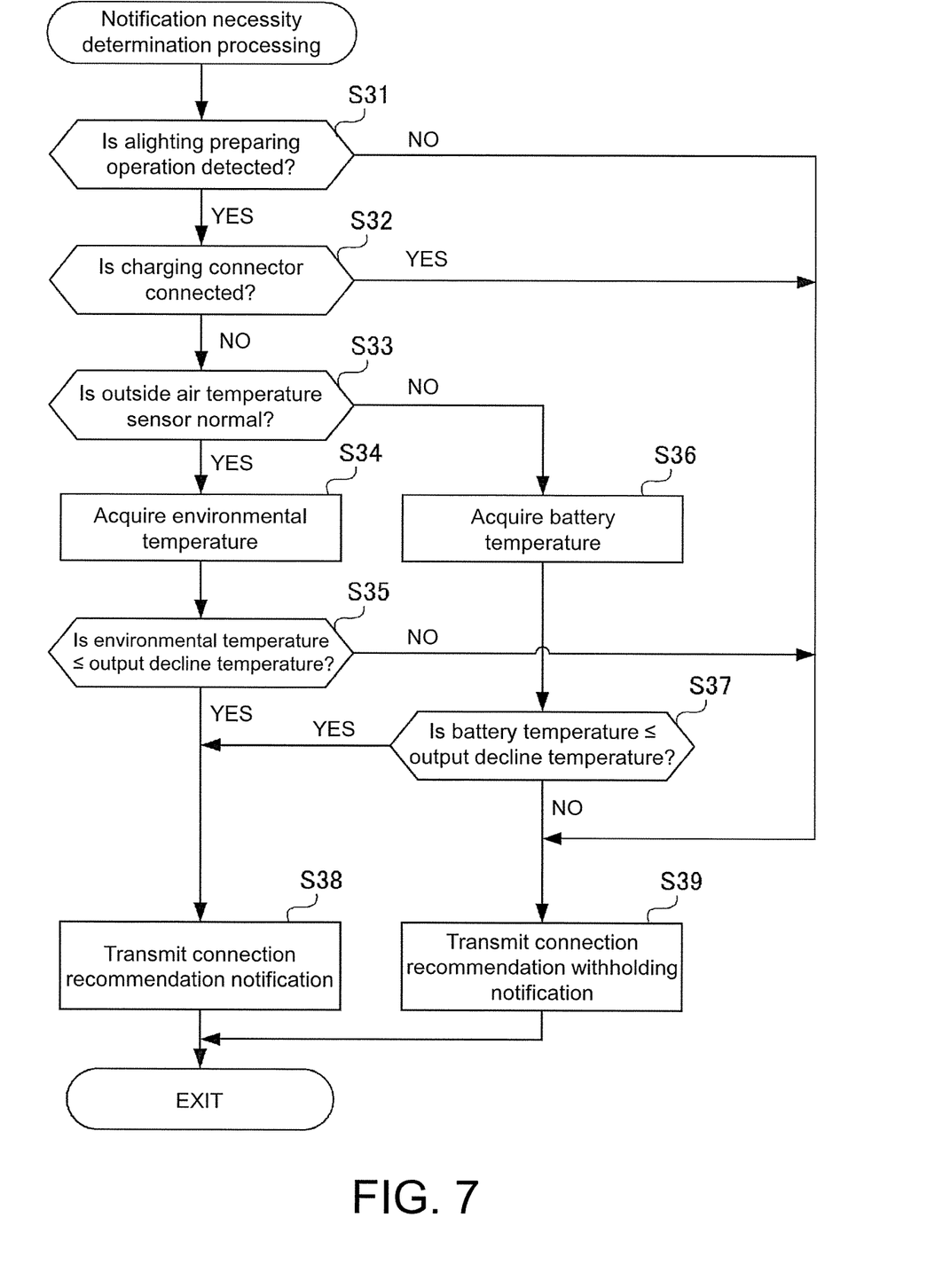
FIG. 7 is a flowchart illustrating a specific procedure of notification necessity determination processing.

FIG. 7 is a flowchart illustrating a specific procedure of notification necessity determination processing related to connection of the charging connector 83. The processing illustrated in FIG. 7 is executed by the charging ECU 61 in a predetermined cycle while the ignition switch IG is turned on.

In S31, the charging ECU 61 determines whether or not an alighting preparing operation, which is a preliminary operation performed when a user alights from the vehicle V, is detected. Specifically, examples of the alighting preparing operation include an operation in which a user decelerates the vehicle V to a vehicle speed near zero, an operation in which a user moves the position of a shift lever to the parking position, an operation in which a user turns off the ignition switch IG, and an operation of a combination thereof. In S31, the charging ECU 61 acquires information related to the current vehicle speed and the current shift position from the main ECU 60. When the current vehicle speed is zero or is equal to or lower than a threshold value set to a value slightly greater than zero, and when the current shift position is at the parking position, the charging ECU 61 determines that an alighting preparing operation is detected, and the charging ECU 61 proceeds to S32. In cases other than that described above, the charging ECU 61 determines that no alighting preparing operation is detected, and the charging ECU 61 proceeds to S39.

In S39, the charging ECU 61 determines that there is no need to prompt a user to connect the charging connector 83 to the inlet 51 and transmits a connection recommendation withholding notification indicating the state to the meter ECU 66 and the BCM 63, thereby ending the processing in FIG. 7.

In S32, the charging ECU 61 determines whether or not the charging connector 83 is connected to the inlet 51 by using a detection signal of the connector sensor 53. When the determination in S32 is YES, the charging ECU 61 proceeds to S39 and transmits a connection recommendation withholding notification to the meter ECU 66 and the like as described above, thereby ending the processing in FIG. 7. When the determination in S32 is NO, the charging ECU 61 proceeds to S33.

In S33, the charging ECU 61 determines whether or not the outside air temperature sensor 652 is normal via the air conditioning ECU 65. When the determination in S33 is YES, the charging ECU 61 proceeds to S34. In the case of NO, the charging ECU 61 proceeds to S36.

In S34, the charging ECU 61 acquires the current outside air temperature via the air conditioning ECU 65 and proceeds to S35 while having the acquired temperature as the environmental temperature of the vehicle V. In S35, the charging ECU 61 determines whether or not the environmental temperature acquired in S34 is equal to or lower than the output decline temperature. When the determination in S35 NO, the charging ECU 61 proceeds to S39 and transmits a connection recommendation withholding notification to the meter ECU 66 and the like as described above, thereby ending the processing in FIG. 7.

In addition, when the determination in S35 is YES, the charging ECU 61 proceeds to S38. Here, a case in which the determination in S35 is YES corresponds to a case in which if the vehicle V is at a stop without having the charging connector 83 connected to the inlet 51, the temperature of the high-voltage battery 2 may fall to the current environmental temperature which is equal to or lower than the output decline temperature, before the next start-up. Therefore, in S38, the charging ECU 61 determines that there is a need to prompt a user to connect the charging connector 83 to the inlet 51 and transmits a connection recommendation notification indicating the state to the meter ECU 66 and the BCM 63, thereby ending the processing in FIG. 7.

In addition, in S36, the charging ECU 61 acquires the current battery temperature via the battery ECU 62 and proceeds to S37. In S37, the charging ECU 61 determines whether or not the battery temperature acquired in S36 is equal to or lower than the output decline temperature. When the determination in S37 is NO, the charging ECU 61 proceeds to S39 and transmits a connection recommendation withholding notification to the meter ECU 66 and the like as described above, thereby ending the processing in FIG. 7. In addition, when the determination in S37 is YES, the charging ECU 61 proceeds to S38 and transmits a connection recommendation notification to the meter ECU 66 and the like as described above, thereby ending the processing in FIG. 7.

Returning to FIG. 6, the charging ECU 61 transmits any one of a connection recommendation withholding notification and a connection recommendation notification to the meter ECU 66 and the BCM 63 by executing the notification necessity determination processing related to connection of the charging connector 83 in accordance with the procedure described above.

Meanwhile, the meter ECU 66 executes the panel display processing in which the meter panel 3 displays various information and which is triggered when the ignition switch IG is turned off. In the panel display processing, when a connection recommendation withholding notification is received from the charging ECU 61 before the ignition switch IG is turned off, the meter ECU 66 causes the meter panel 3 to display various information set for alighting (for example, information related to an external charging schedule, information related to a driving evaluation score for the present driving cycle, and predetermined ending animation) for a predetermined period of time.

In addition, in the panel display processing, when a connector connection recommendation notification is received from the charging ECU 61 before the ignition switch IG is turned off, the meter ECU 66 causes the meter panel 3 to display a connector connection recommendation message prompting a user to connect the charging connector 83 to the inlet 51 (specifically, for example, a text such as "The temperature is low. Please connect the charging connector"). Thereafter, the various information set for alighting is displayed. A display period of the connector connection recommendation message is a predetermined time (for example, six seconds) from the time immediately after the ignition switch IG is turned off.

In the charging ECU 61, since the notification necessity determination processing in FIG. 7 is repetitively executed until the ignition switch IG is turned off, there are cases in which the details of a notification transmitted from the charging ECU 61 change during a period from when an alighting preparing operation of a user is first detected until the ignition switch IG is turned off. Specifically, although a connection recommendation notification has been transmitted since the charging connector 83 is not connected when an alighting preparing operation is first detected, when the charging connector 83 is connected thereafter before the ignition switch IG is turned off, there are cases in which a connection recommendation withholding notification is transmitted. In such a case, the meter ECU 66 executes the panel display processing based on the latest notification, that is, a notification received immediately before the ignition switch IG is turned off.

Meanwhile, the BCM 63 executes warning processing in which the portable terminal P held by a user assumed to be present outside and near the vehicle displays various warning information and which is triggered by detection of an alighting operation which is an operation when the user alights. Here, when at least any one of turning off the ignition switch IG, opening a door, closing a door, and locking a door is detected, the BCM 63 determines that an alighting operation is detected, and the BCM 63 starts the warning processing.

In the warning processing, the BCM 63 transmits warning information to the portable terminal P via the short-range radio communication unit 638. The warning information is configured based on a plurality of pertinent warning items. In addition, specifically, the warning items include an item related to low battery SOC, an item related to hazard lamps forgotten to be turned off, an item related to doors forgotten to be locked, an item related to a neglected power-on state, an item related to a connector connection recommendation notification, and the like.

For example, the BCM 63 activates the item related to a connector connection recommendation notification among the warning items when a connector connection recommendation notification is received from the charging ECU 61 before an alighting operation is detected. The BCM 63 deactivates an item related to a connector connection recommendation notification among the warning items when a connector connection recommendation withholding notification is received from the charging ECU 61 before an alighting operation is detected. Due to the same reason as above, the BCM 63 executes the warning processing based on a notification received immediately before an alighting operation is detected.

In addition, when the portable terminal P can receive warning information from the short-range radio communication unit 638 through the warning processing of the BCM 63, the portable terminal P executes warning display processing in which the display thereof displays the details of the warning information at a timing set in advance. In the warning display processing, the display of the portable terminal P displays activated warning items in the received warning information. For example, when the item related to a connector connection recommendation notification is activated in the received warning information, the display of the portable terminal P displays a connector connection recommendation message prompting a user to connect the charging connector 83 to the inlet 51.

Meanwhile, the navigation ECU 64 executes vehicle information transmission processing in which vehicle information that is information related to a state of the vehicle V is successively transmitted to the server SV via the broadband radio communication unit 642. Examples of the vehicle information transmitted to the server SV through the vehicle information transmission processing include information related to an on/off state of the ignition switch IG and information related to whether or not the charging connector 83 is connected to the inlet 51.

In addition, in the server SV, remote notification processing, in which the portable terminal P is notified of the information related to a state of the vehicle V using the vehicle information transmitted from the vehicle V, is executed at a set time which has been set in advance. The set time at which the remote notification processing is executed can be set to a time preferred by a user, by utilizing a distribution setting application installed in the portable terminal P.

In addition, in the remote notification processing, when it is determined that the ignition switch IG is turned off and the charging connector 83 is not connected to the inlet 51 at the point of time of the set time, based on the vehicle information obtained at this point of time, the server SV transmits a notification, which includes a connector connection recommendation message indicating that the charging connector 83 is not connected to the inlet 51, to the portable terminal P, for example, utilizing short message service. The display of the portable terminal P displays the connector connection recommendation message based on the notification received from the server SV.

Hereinabove, embodiments of the invention have been described. However, the invention is not limited thereto. The details of the configuration may be changed within the scope of the gist of the embodiments of the invention. For example, in the embodiment, in the notification necessity determination processing in FIG. 7, as an outside air temperature at the time when an alighting preparing operation is detected, the environmental temperature of the vehicle V is applied. The environmental temperature and the output decline temperature are compared to each other on the assumption that the battery temperature will fall to the environmental temperature acquired at this point of time when the vehicle V is restarted. Then, it is determined whether to transmit a connection recommendation notification or to transmit a connection recommendation withholding notification. However, the embodiments of the invention are not limited thereto. That is, in the notification necessity determination processing, it may be determined whether to transmit a connection recommendation notification or to transmit a connection recommendation withholding notification, by acquiring a predicted environmental temperature which is an environmental temperature predicted to be realized after a predetermined time from the time when the alighting preparing operation is detected, instead of acquiring the environmental temperature at the time when an alighting preparing operation is detected, and comparing the predicted environmental temperature and the output decline temperature to each other. Specifically, the predicted environmental temperature is a prospective lowest temperature of a day to which the time when an alighting preparing operation is detected belongs, the next day, or the like. For example, such a prospective lowest temperature can be acquired by utilizing the car navigation system described above.

In addition, in the embodiment, when the charging connector 83 is connected to the inlet 51 and the temperature of the high-voltage battery 2 is equal to or lower than the output decline temperature, the external heating control processing in which the high-voltage battery 2 is heated by driving the battery heater unit 24 (refer to FIG. 5) is performed. However, there are cases in which the external heating control processing does not have to be executed. For example, when the external charging control processing in FIG. 4 is executed, the high-voltage battery 2 is charged by power supplied from the external power source 80 and is heated by means of heat of reaction or Joule heat generated during the charging. Therefore, there are cases in which the high-voltage battery 2 can be sufficiently heated without executing the external heating control processing in FIG. 5.

In addition, in the embodiment, in the external heating control processing in FIG. 5, the battery heater unit 24 is driven by using power supplied from the external power source 80. However, the embodiments of the invention are not limited thereto. That is, power may be supplied to the battery heater unit 24 from the high-voltage battery 2 instead of the external power source 80.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrically driven vehicle including a storage battery and an inlet connected to the storage battery, wherein a connector of an external power supply source is connected to the inlet, and power is able to be supplied from the external power supply source to the storage battery, the electrically driven vehicle comprising:
    alighting preparing operation detection means for detecting an alighting preparing operation of a user;
    temperature acquisition means for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and
    notification means for prompting a user to connect the connector to the inlet when the environmental temperature, the predicted environmental temperature, or the storage battery temperature, which has been acquired, is equal to or lower than a predetermined temperature.

2. The electrically driven vehicle according to claim 1, wherein the notification means includes a display panel which is provided inside the vehicle and is visually recognizable by a driver, and
    wherein when the environmental temperature, the predicted environmental temperature, or the storage battery temperature, which has been acquired, is equal to or lower than the predetermined temperature, the display panel displays a message prompting a driver to connect the connector to the inlet for a predetermined period of time after an ignition switch is turned off.

3. The electrically driven vehicle according to claim 2, further comprising:
    a heater that heats the storage battery by using power supplied from the external power supply source or the storage battery.

4. The electrically driven vehicle according to claim 1, further comprising:
    a heater that heats the storage battery by using power supplied from the external power supply source or the storage battery.

5. A notification system comprising:
    an electrically driven vehicle having a storage battery and an inlet connected to the storage battery, wherein a connector of an external power supply source is connected to the inlet, and power is able to be supplied from the external power supply source to the storage battery; and
    a portable terminal configured to communicate with the electrically driven vehicle,
    wherein the electrically driven vehicle includes alighting preparing operation detection means for detecting an alighting preparing operation of a user; temperature acquisition means for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and communication means for transmitting a notification signal to the portable terminal when the environmental temperature, the predicted environmental temperature, or the storage battery temperature, which has been acquired, is equal to or lower than a predetermined temperature, and
    wherein the portable terminal prompts a user to connect the connector to the inlet when the notification signal is received.

6. The notification system according to claim 5, wherein the alighting preparing operation
    wherein the electrically driven vehicle further includes a heater configured to heat the storage battery by using power supplied from the external power supply source or the storage battery.

7. The notification system according to claim 1, wherein the alighting preparing operation includes an operation of decelerating a vehicle speed of the electrically driven vehicle, an operation of moving a shift lever to a parking position, an operation of turning off an ignition switch, and an operation of a combination thereof.

8. An electrically driven vehicle including a storage battery and an inlet connected to the storage battery, wherein a connector of an external power supply source is connected to the inlet, and power is able to be supplied from the external power supply source to the storage battery, the electrically driven vehicle comprising:
    alighting preparing operation detection means for detecting an alighting preparing operation of a user;
    temperature acquisition means for acquiring an environmental temperature at a time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation;

notification means for prompting a user to connect the connector to the inlet, wherein the notification means includes a display panel which is provided inside the vehicle and is visually recognizable by a driver; and a heater that heats the storage battery by using power supplied from the external power supply source or the storage battery, wherein when the environmental temperature, or the storage battery temperature, which has been acquired, is equal to or lower than a low-output temperature that is determined based on a temperature-dependence characteristic of an output of the storage battery, the display panel displays a message prompting a driver to connect the connector to the inlet for a predetermined period of time after an ignition switch is turned off, and when the connector of the external power supply source is connected to the inlet, an electricity conduction control of the electric heater is performed to maintain the storage battery temperature at a heating target temperature that is set to be the low-output temperature.

\* \* \* \* \*